W. H. JOHNSON.
SIGNALING DEVICE.
APPLICATION FILED MAR. 1, 1918.
1,378,237.
Patented May 17, 1921.
2 SHEETS—SHEET 1.
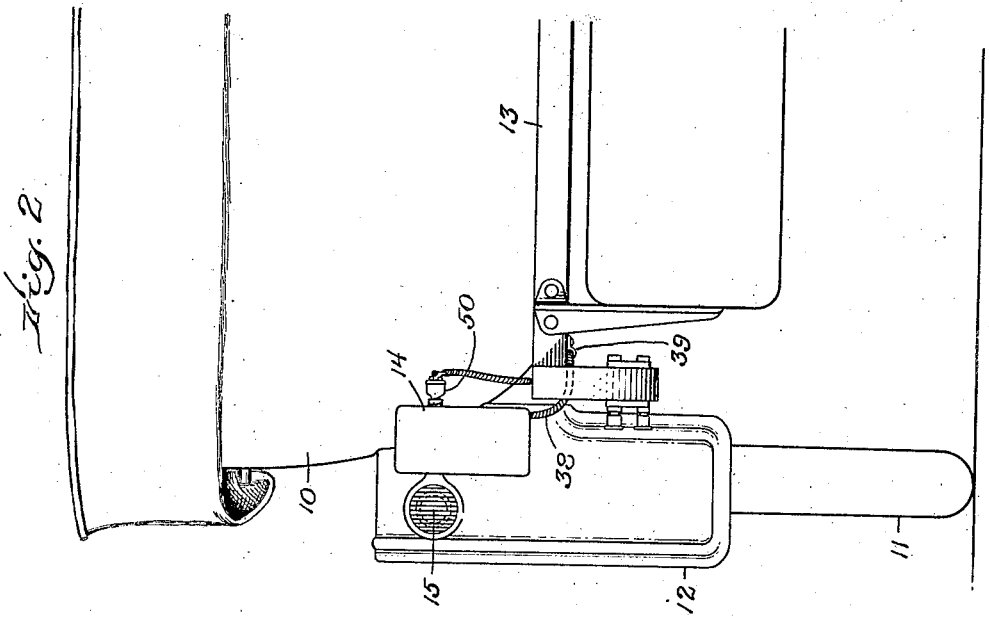
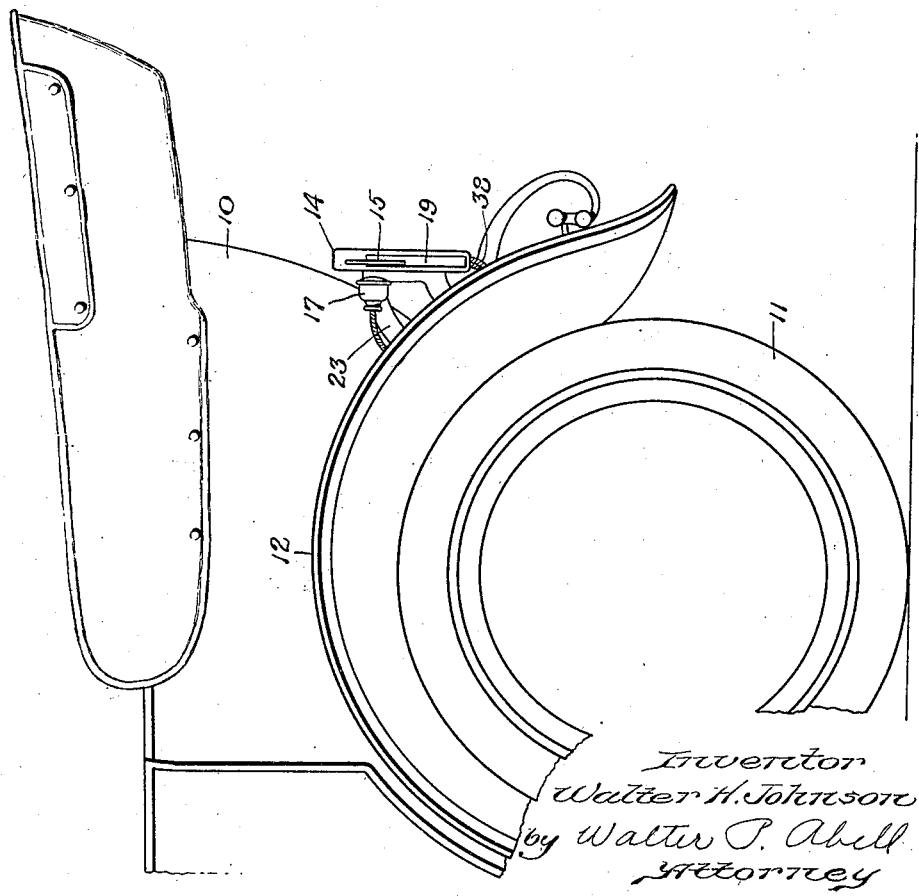
Inventor
Walter H. Johnson
by Walter P. Abell
Attorney

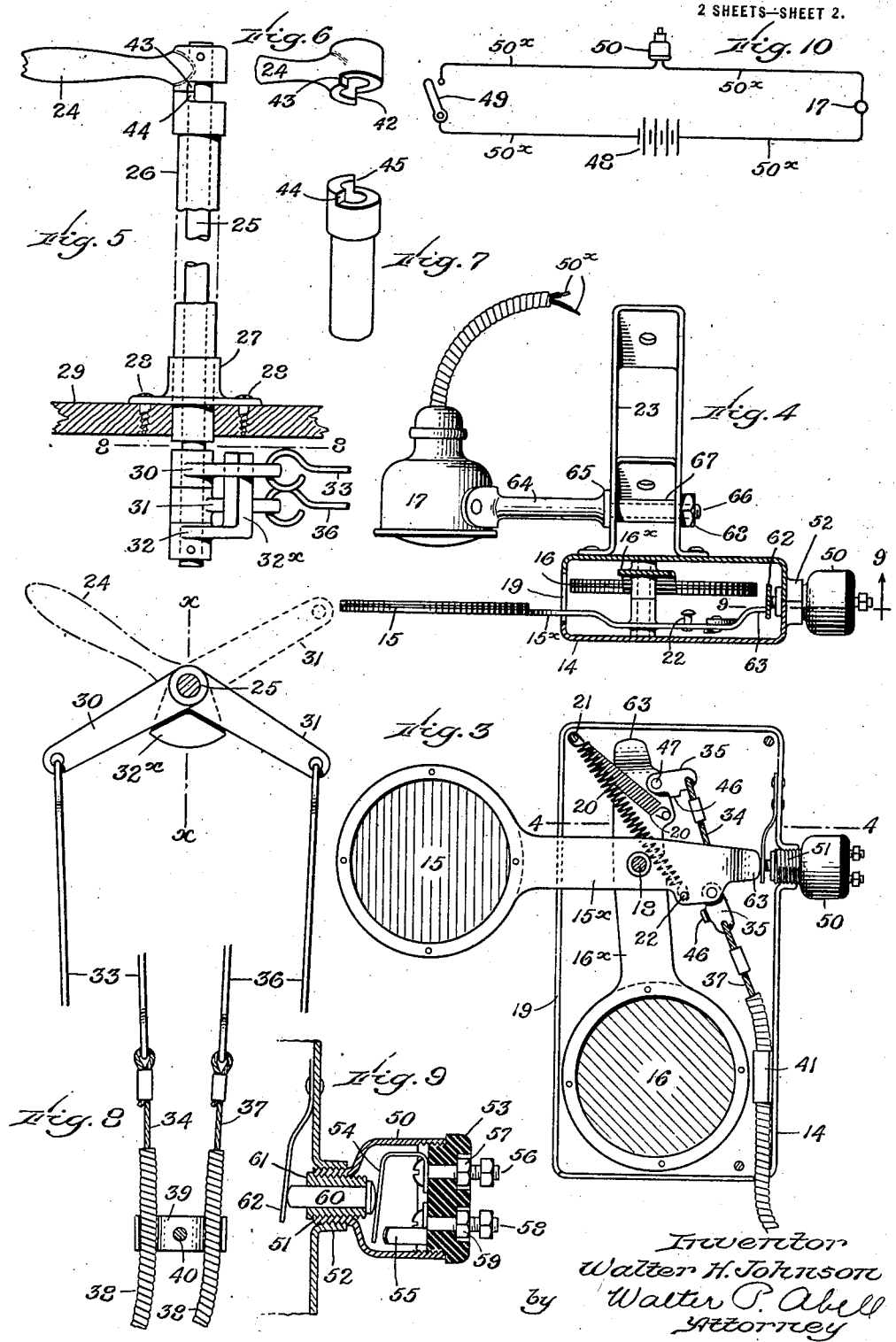

UNITED STATES PATENT OFFICE.

WALTER H. JOHNSON, OF BOSTON, MASSACHUSETTS, ASSIGNOR TO CHESTER I. CAMPBELL, OF QUINCY, MASSACHUSETTS.

SIGNALING DEVICE.

1,378,237.                Specification of Letters Patent.      Patented May 17, 1921.

Application filed March 1, 1918. Serial No. 220,105.

*To all whom it may concern:*

Be it known that I, WALTER H. JOHNSON, a citizen of the United States, and resident of Boston, in the county of Suffolk and State of Massachusetts, have invented certain new and useful Improvements in Signaling Devices, of which the following is a specification.

The object of the present invention is to provide an improved signaling device for vehicles, especially motor vehicles. Collisions between vehicles frequently occur when one vehicle reduces speed, stops, or turns to one side or the other, without giving due warning to vehicles that are following or that are approaching in the opposite direction. The signaling device to which the present invention relates is intended to give such warning with a view to avoid such collisions, and although the device is capable of being mounted upon a vehicle at any desired location, depending upon the point of view from which it is intended to be observed, I have shown it, in the present instance, as being mounted upon the rear portion of the vehicle in position to be observed by a vehicle in the rear following in the same direction of travel.

In the present embodiment of the invention there are certain improved features of special importance in connection with daylight use, and other features of special importance in connection with night use, the device including a lamp arranged to cast rays of light through translucent disks of colored material for night signaling. Other features of the device are illustrated by the accompanying drawings, and are hereinafter described and claimed.

Referring to the accompanying drawings—

Figure 1 represents a left side elevation of the rear portion of a motor vehicle, upon the rear wheel-fender of which the indicating elements of the signaling device are mounted.

Fig. 2 represents a rear elevation of that portion of the vehicle and signaling device that are included in Fig. 1.

Fig. 3 represents a vertical cross-section through the indicating unit of the signaling device, one of the signals being shown in signaling position, and the other being shown in non-signaling position.

Fig. 4 represents a horizontal cross-section through the structure shown by Fig. 3 as indicated by line 4—4 of Fig. 3.

Fig. 5 represents an elevation of the signal-operating mechanism, which is mounted upon and secured to the floor of the driver's compartment. Said floor is represented in section.

Fig. 6 represents a perspective view of the operating handle.

Fig. 7 represents a perspective view of a fixture with which the operating handle coöperates to lock the signals in signaling position.

Fig. 8 represents a top plan view of the operating connections that extend from the driver's position to the signaling unit shown by Fig. 3.

Fig. 9 represents a vertical section through an electric switch by which a signaling circuit may be closed automatically and coincidentally with the operation of moving a signal to signaling position. The plane of this section is indicated by line 9—9 of Fig. 4.

Fig. 10 represents a diagram of the signaling circuit that includes the signaling lamp, and the automatic switch aforesaid.

The same reference characters indicate the same parts wherever they occur.

Referring to Figs. 1 and 2, which include the rear portion of a touring car, the tonneau is indicated at 10, a wheel at 11, and a wheel-fender at 12. As shown by Fig. 2 the body is mounted upon the usual frame 13.

The indicating unit of the signaling device includes a casing 14, two signals 15 and 16, a lamp 17, and other details hereinafter specified.

The signals 15 and 16 are made of translucent material of different colors. The material may be glass or celluloid, and the colors may be any desired, although I prefer red for one of them and green for the other. In accordance with this preference disk 15 is indicated conventionally as being red, and disk 16 as being green. The two signals are mounted upon carriers $15^x$, $16^x$ respectively, these carriers being in the form of semaphore arms, and having ring-shaped portions at their outer ends where the signals are mounted. The carriers are movable independently of each other to and from signaling position, the casing 14 serving as a support and housing for them. In the present instance the carriers are mounted on a pivot pin 18, and are arranged to pass in and out of the casing through an opening 19 formed in one wall of the latter. Each carrier is provided with retracting spring 20 whereby the signal is normally retracted to non-signaling position within the casing. For this purpose one end of the spring is attached to a fixed pin 21 and the other end is connected to the carrier by a pin 22.

In order to have the casing 14 as inconspicuous as possible, and in order to have the signals 15 and 16 as conspicuous as possible, I paint the casing and the carriers 15ˣ, 16ˣ the same color as the adjacent portions of the vehicle. For example, assuming that the body and fenders of the vehicle are black, I would paint the casing 14 and the carriers 15ˣ, 16ˣ black, the signals 15 and 16 being of some contrasting colors being thereby rendered conspicuous by reason of the black background and surroundings.

In the present instance the casing 14 is mounted upon the fender 12 by means of a bracket 23, and is arranged to display the signals in such manner that they will be readily observable by the occupants of a vehicle following in the rear.

The operating mechanism for moving the signals to signaling position is shown by Figs. 5 to 8. Referring to Fig. 5 an operating handle is indicated at 24. This handle is affixed to a rockshaft 25, and the latter is mounted in a bearing structure comprising a tube 26. The lower end of the tube is affixed in a base 27, and the latter is fastened by screws 28 to the floor 29 of the driver's compartment. The lower end of the shaft 25 extends below the floor 29, and is provided with arms 30, 31, and 32. Arms 30 and 31 are loosely mounted upon the shaft, but arm 32 is affixed to the shaft and serves as a common actuator for arms 30 and 31. For the latter purpose arm 32 is provided with the portion 32ˣ that stands between arms 30 and 31 as shown by Fig. 8. A rod or wire 33 extends to the rear from arm 30, and is connected to a flexible cord 34, which in turn is connected to carrier 16ˣ by a link 35. A rod or wire 36 extends from arm 31 to the rear, and is connected to a flexible cord 37, which in turn is connected to carrier 15ˣ by another link 35. Cords 34 and 37 extend through guide tubes 38, 38, which are preferably made of metal and are sufficiently flexible to enable them to be readily flexed to be curved as shown by Fig. 2. In the present instance the forward portions of tubes 38 are fastened to the frame 13 by a clip 39, and screw 40, and their rear ends extend into the casing 14 and are fastened to the latter by a clip 41.

When both signals are held in their normal or non-signaling position by springs 20 the arms 30 and 31 are held in the positions represented by solid lines in Fig. 8, and operating handle 24 is thereby held in a median angular position parallel to the length of the vehicle. The fore and aft line of the vehicle is indicated in Fig. 8 by a broken line x—x, and the operating handle would be parallel to said line under the aforesaid conditions. When, however, it is desired to display the signal 15 the operating handle would be moved, in the present instance, to the left, or to the position represented by broken lines in Fig. 8. Such movement of the handle would cause arm 32 to move arm 31 to the position represented by broken lines, thus pulling forward the connections 36, 37, and swinging the signal to signaling position as shown by Figs. 1 to 4. If the operating handle were moved to the right from the aforesaid median position arm 32 would act upon arm 30 to move signal 16 to signaling position. The signal-returning springs 20 have a reactive effect upon the operating handle 24 through the medium of arm 32, to return the handle to its median position whenever a signal is retracted into the casing.

I have provided means for locking the signals in signaling position, said means being effective in consequence of endwise movement of rockshaft 25. As shown by Fig. 6 the hub of operating handle 24 is formed with a segmental portion the ends of which are defined by shoulders 42, 43. In like manner the upper portion of bearing structure 26 is provided with a segmental portion the ends of which are defined by shoulders 44, 45. When the handle is in its median position the two segmental portions above mentioned bear one upon another as shown by Fig. 5, but when that of the handle is carried beyond that of the bearing structure by angular movement of the handle the rockshaft is free to drop slightly in relation to the bearing structure to place shoulder 42 behind shoulder 44, or to place shoulder 43 behind shoulder 45, as the case may be, depending upon the direction in which the handle is moved. A slight upward pull on the handle 24 is sufficient to release one locking shoulder from the other, and whenever the handle is unlocked it will return to its median position under the influence of the spring 20 that happens to be distended at that time.

Referring to Fig. 3, the links 35 by which the flexible cords are connected to the signal carriers are provided with ears 46 for the purpose of holding the cords a sufficient distance from the "dead center" line of pull when the carriers are retracted to the position at which carrier 16ˣ is shown. Links 35 are connected to the carriers by pivot pins 47, and ears 46 are bent or offset so as to engage the edges of the carriers as shown in connection with carrier 16ˣ.

For night signaling I provide a lamp, and arrange the latter in front of the point at which the signals are displayed, the lamp being disposed so as to cast rays of light to the rear through whichever signal is in signaling position. The lamp for this purpose is that indicated at 17. In the present instance an electric lamp is provided, and its circuit is controlled by a switch that is under the control of the carriers 15×, 16× in such manner that the circuit will remain open so long as both signals are in non-signaling position, but will be closed whenever one of the signals is in signaling position. The purpose of controlling the lamp circuit as aforesaid is to minimize the consumption of current, no demand being made for the latter excepting when a signal is in signaling position. In Fig. 10 the lamp 17 is indicated conventionally. A source of current such as a storage battery is indicated at 48, and a common hand switch is indicated at 49. The casing of the aforesaid automatic switch is indicated at 50. The elements 17, 48, 49 and 50 are all connected in series by suitable wires or other conductors 50×. Switch 49 may be located at any desired place in the vehicle to be opened and closed manually by one of the occupants. Its structure is of no special importance for present purposes, excepting that it will not open or close the circuit at that point excepting when it is moved manually.

For the sake of facilitating the installing and removal of the automatic switch 50 the latter is assembled as a separate unit, and may be attached to and detached from signal casing 14 without disturbing the latter and without taking apart the switch. The switch casing 50 is, accordingly, made in tubular form, as shown by Fig. 9, one end thereto being of relatively small diameter to provide a neck 51. This neck is provided with an external screw thread for engaging an internal screw thread formed in an annular flange 52 of casing 14. The neck of casing 50 is thus adapted to be screwed into the hole defined by flange 52. The outer end of casing 50 is provided with an internal screw thread into which a cap 53 of insulating material may be screwed. This cap carries the contacts or terminals 54, 55 of the switch, terminal 54 being secured to the cap by binding screw 56 and nut 57, and terminal 55 being secured by binding screw 58 and nut 59. The terminal 54 is flexible and springy and normally stands away from the terminal 55, as shown. Plunger 60 is arranged to slide endwise in the bushing 61, the latter being screwed into neck 51. Plunger 60 projects slightly into casing 14 to be moved by carriers 15×, 16×, but in order to insure the desired action of the carriers upon the plunger an element 62 of considerable width is interposed between them.

Element 62 is shown in the form of a leaf spring, its upper portion being riveted to the adjacent wall of casing 14 so that its lower portion will lap the inner end of plunger 60, and lie within the range of travel of the end portions 63 of the two signal carriers. The normal position of element 62 is shown by Fig. 9.

Whenever one of the signals is moved to signaling position the end 63 of the carrier then in use displaces element 62 as shown by Fig. 3, thereby moving plunger 60 from left to right, with the result that terminal 54 is moved into contact with terminal 55. The circuit will thus be closed through lamp 17, provided hand switch 49 is also closed. When the signal is returned to non-signaling position it releases plunger 60 so that terminal 54 may spring away from terminal 55 to open the circuit at that point. Switch 49 need not be opened excepting in the daytime, because the lamp circuit will not be completely closed unless a signal is in signaling position. Therefore, in using the device for night signaling, the driver or other occupant of the vehicle has merely to see that switch 49 is closed, and thereafter to move the operating handle 24 to the right or left according to the signal desired to be displayed.

Lamp 17 is supported by a stud 64, and the stud is, in turn, supported by bracket 23. For this purpose the stud is provided with a flange 65, and with a screw shank 66. The shank is passed through holes in bracket 23. A tubular spacer 67 is placed between two separated portions of bracket 23, and the screw shank extends through it. A clamping nut 68 is screwed upon shank 66 and bears against one side of the bracket. Flange 65 is thus drawn against the opposite side of the bracket, and the clamping stress between the two sides of the bracket is sustained by the interposed spacer 67 so that the bracket will not be injured or distorted by such stress.

I claim—

1. A signaling device comprising a controlling rockshaft, a bearing structure for said rockshaft, two oscillatory members loosely arranged up on said rockshaft, an actuator common to both said members, said actuator being affixed to said rockshaft, one of said members being arranged to be moved by said actuator when said rockshaft is moved in one direction from a median angular position, the other one of said members being arranged to be moved by said actuator when said rockshaft is moved in the opposite direction from said median position, two independently movable signals, means for transmitting angular motion from one of said members to one of said signals, means for transmitting angular motion from the other one of said members to the other one of said signals, and means arranged to lock said rockshaft against return angular motion toward said median position when said rockshaft is displaced to either side of said position a predetermined angular extent, said locking means including oscillatory shoulders carried by said rockshaft and fixed shoulders, said oscillatory shoulders being movable to and from locking position by endwise movement of said rockshaft.

2. A signaling device comprising a plurality of movable signals, operating means therefor including a manually movable rockshaft and connections arranged to operate the signals selectively according to the direction of angular movement imparted to the rockshaft, and locking means operable by endwise movement of the rockshaft to lock the signals respectively in one position.

3. A signaling device comprising a plurality of signal members movable individually to and from operative position, and operating means therefor including an oscillatory handle movable about an axis in opposite directions from a neutral position, said handle being otherwise movable to lock and release the signal members.

In testimony whereof I have affixed my signature.

WALTER H. JOHNSON.